UNITED STATES PATENT OFFICE.

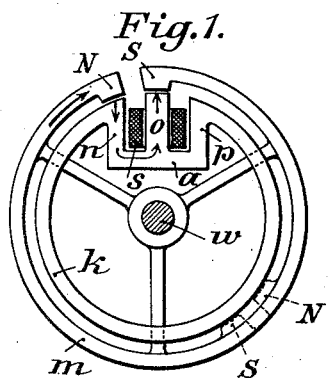
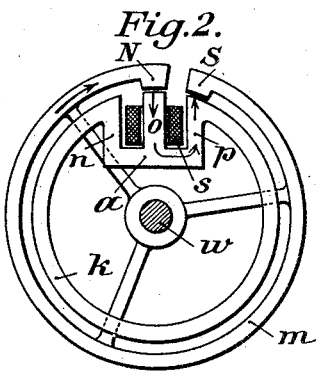
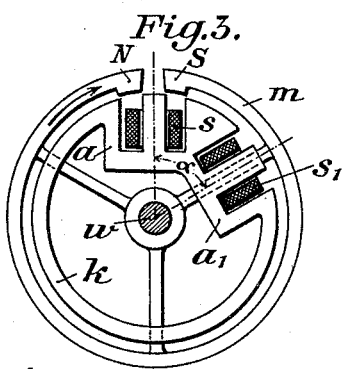
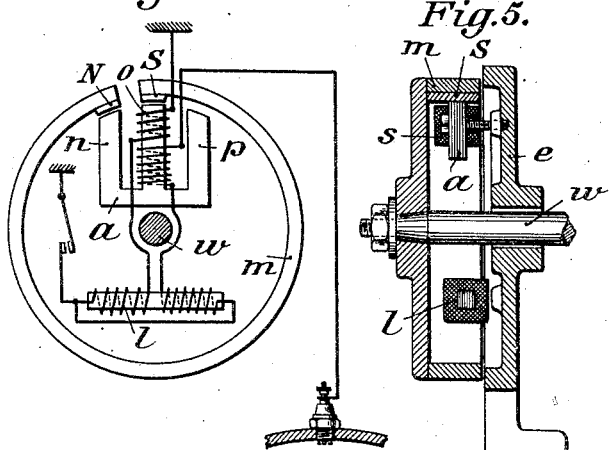
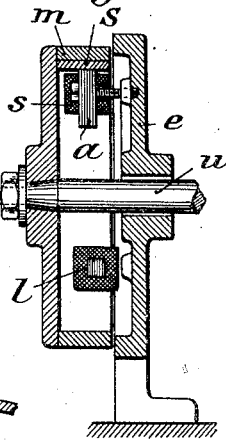

AUGUST KAZENMAIER, OF STUTTGART, GERMANY, ASSIGNOR TO THE FIRM ROBERT BOSCH AKTIENGESELLSCHAFT, OF STUTTGART, GERMANY.

FLYWHEEL MAGNETO.

1,424,201.   Specification of Letters Patent.   Patented Aug. 1, 1922.

Application filed March 13, 1920. Serial No. 365,685.

(GRANTED UNDER THE PROVISIONS OF THE ACT OF MARCH 3, 1921, 41 STAT. L., 1313.)

*To all whom it may concern:*

Be it known that I, AUGUST KAZENMAIER, a citizen of Germany, residing at and whose post-office address is Stuttgart, Muhlrain 9, Germany, have invented certain new and useful Improvements in Flywheel Magnetos, (for which I have filed applications in Germany November 21, 1918, Patent Nos. 340,291 and 325,357), of which the following is a specification.

The invention relates to sparking coils for the ignition of internal combustion engines in which the magnet is formed as a rotating wheel.

According to the invention, one or more armatures, preferably, having three limbs, are arranged between the magnet and the shaft of the wheel. As compared to the known type of rotating magnets, formed as more or less broad rings or ring segments within the fly wheel rim, the construction enables a smaller diameter to be given to the fly wheel magnet, since the space formerly taken up by the ring magnet is saved. Also the weights are perfectly balanced which is not the case in a ring segment lying within the fly wheel rim or, at least, is very difficult to obtain. With unequally distributed masses at high speeds of rotation of the magnets there is, after a short time, an unsymmetrical wear of the bearing which causes the rotating ring magnets to rub against the pole shoes of the armature and soon renders the magnets unserviceable. The fly wheel magneto according to the invention is, preferably, constructed so that the end limbs of the armature or armatures within the fly wheel rim are connected by a yoke member forming the segment of a ring. Thereby, in every position of the magnet when stationary, the magnetic circuit is closed, while, during the movement of the magnet, although this circuit is closed, if the yoke member is laminated, the eddy current losses are very small. Also, for the V type of cylinders, the fly wheel magnet according to the invention can be very conveniently employed, if two armatures within the wheel rim are arranged at the same angular distance apart as the cylinders so that two ignition sparks are produced in corresponding sequence.

In order to produce a powerful induction current according to the invention the armature coil is connected in series with an auxiliary coil arranged external to the armature, but within the fly wheel rim. This enables the measurements of the main coil and, consequently, also those of the armature and of the magnet to be very small, which is very important in many cases on account of the limited size of the ignition machine.

In the accompanying drawing some examples of fly wheel magnetos according to the invention are shown diagrammatically.

Figs. 1 and 2 show a fly wheel magnet with a three limbed armature in different positions of the wheel relatively to the armature.

Fig. 3 shows a fly wheel magnet with two three limbed armatures at an angular distance apart.

Figs. 4 and 5 show a view and a section through a magnet with the auxiliary coil.

The wheel rim $m$ is constructed as a magnet with pole shoes N, S projecting only slightly inwards. Between the rim and the shaft $w$ there is an armature $a$ with three limbs $n$, $o$ $p$, of which the middle limb $o$ carries a winding $s$ comprising a primary and a secondary coil, while the end limbs $n$ and $p$ form the poles of the armature and are at the same distance from the middle limb as that separating the two poles N, S of the permanent magnet $m$. In the positions of the magnet $m$ in which its poles N, S are not near to the limbs of the armature $a$, the magnetic circuit need not be closed. It is, however, preferable, as in the example shown, to connect the end limbs $n$, $p$ of the armature by a ring shaped yoke piece $k$ so that in every stationary position of the wheel magnets the magnetic circuit is closed (see the dotted position of the poles N, S in Fig. 1), while as the magnet rotates the eddy losses are reduced as far as possible. In the position of the wheel $m$ shown in Fig. 1 there is a full magnetic flux through the limb $o$ and, therefore, through the induction winding $s$, while as shown in Fig. 2 the maximum flux from the North pole traverses the winding $s$ through the limb $o$ in the opposite direction, that is, between the two positions the voltages produced pass from their highest positive to their highest negative value. In a two limbed armature the magnetic flux is only in one direction.

In the example shown in Fig. 3, there are two armatures $a$ and $a_1$, displaced by the angle $\alpha$, whereby, two ignition sparks at this angular distance apart are obtained in succession, so that this construction is especially suited to the V type of cylinders. As the drawing shows, also, in this arrangement of multiple armatures the size of the wheel magnet is considerably reduced.

As shown in Figs. 4 and 5, within the permanent magnet, but external to the armature, an auxiliary coil $l$ comprising a primary and a secondary winding, connected in series with the main coil assists the action of the latter. The coil $l$ is so arranged that it cannot be traversed by the lines of force of the magnet, or otherwise an induced current might be produced in the auxiliary coil by the passage of the magnet, strong enough at high speeds of rotation to cause ignition sparks at incorrect times.

By the arrangement described the main coil, and therefore also the armature $a$ and the whole fly wheel magnets may be small, since a considerable part of the high tension winding necessary for the production of a powerful induced current is arranged external to the armature on the auxiliary coil placed within the wheel rim. The auxiliary coil can also be used with ring magnets arranged within the wheel rim opposite the armature, and in this case also the armature and therefore also the fly wheel magnet may be of small dimensions.

Having now particularly described and ascertained the nature of my said invention and in what manner the same is to be performed, I declare that what I claim is:—

1. A flywheel magneto comprising a shaft, the outer portion of the flywheel constituting the magnet, an armature positioned between the outer portion of said wheel and the shaft and having a primary and secondary winding, an auxiliary coil external to said armature and included within the periphery of said wheel, said coil having a primary and a secondary winding, connections uniting the primary portions and the secondary portions of said windings, respectively, in series, and means uniting said connected primary windings in parallel relation with said connected series windings.

2. A flywheel magneto comprising a shaft, the outer portion of the flywheel constituting the magnet, an armature positioned between the outer portion of said wheel and the shaft and having a primary and secondary winding, an auxiliary coil external to said armature and positioned within the periphery of said wheel in such manner as to be shielded from the lines of force emanating from said magnet, said coil having primary and secondary windings in series, respectively, with the primary and secondary windings of said armature.

In testimony whereof I have affixed my signature in presence of two witnesses.

AUGUST KAZENMAIER.

Witnesses:
 ADOLF LEBHEN,
 JNO. MARSTON MEYER.